(12) United States Patent
Chessell et al.

(10) Patent No.: US 10,558,540 B2
(45) Date of Patent: Feb. 11, 2020

(54) PATTERN BASED BEHAVIOR MODEL FOR SYSTEM MANAGEMENT

(71) Applicant: International Business Machines Corporation, Armonk, NY (US)

(72) Inventors: Amanda E. Chessell, Alton (GB); Harald C. Smith, Groveland, MA (US); Dougal A. Watt, Auckland (NZ)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 14/578,595

(22) Filed: Dec. 22, 2014

(65) Prior Publication Data

US 2016/0180230 A1 Jun. 23, 2016

(51) Int. Cl.
*G06F 11/30* (2006.01)
*G06N 5/02* (2006.01)

(52) U.S. Cl.
CPC .............. *G06F 11/30* (2013.01); *G06N 5/02* (2013.01)

(58) Field of Classification Search
CPC .................................. G06N 5/02; G06F 11/30
See application file for complete search history.

(56) References Cited

U.S. PATENT DOCUMENTS

| | | | |
|---|---|---|---|
| 7,058,953 B2 | 6/2006 | Willard et al. | |
| 7,627,671 B1 | 12/2009 | Palma et al. | |
| 7,660,702 B2 * | 2/2010 | Blight | G06F 11/3495 702/186 |
| 7,797,147 B2 | 9/2010 | Vinberg et al. | |
| 7,941,454 B2 * | 5/2011 | Chessell | G06F 11/302 707/802 |
| 8,572,439 B2 | 10/2013 | Stanko et al. | |
| 2005/0091635 A1 * | 4/2005 | McCollum | G06F 8/20 717/101 |
| 2007/0028220 A1 | 2/2007 | Miller et al. | |
| 2008/0040174 A1 | 2/2008 | Murthy et al. | |
| 2011/0214161 A1 * | 9/2011 | Stolfo | H04L 63/145 726/4 |
| 2013/0085885 A1 * | 4/2013 | Sahai | G06Q 50/06 705/26.4 |

OTHER PUBLICATIONS

OWL Services Coalition, OWL-S: Semantic Markup for Web Services, available at http://www.daml.org/services/owl-s/1.1B/owl-s/owl-s.html, accessed Jan. 30, 2019, 2004, 19 pages. (Year: 2004).*
"Appendix P: List of IBM Patents or Patent Applications Treated as Related"; Filed Sep. 10, 2015; pp. 1-2.

(Continued)

*Primary Examiner* — Vincent Gonzales
(74) *Attorney, Agent, or Firm* — Edward J. Wixted, III

(57) ABSTRACT

An approach for providing guidance and management of a data processing system. A processor stores at least one design pattern corresponding to a plurality of components of the data processing system. A processor generates a behavioral model of the data processing system based, at least in part, on the stored at least one design pattern. A processor monitors actual behavior of the data processing system. A processor compares the actual behavior of the data processing system to the behavioral model of the data processing system. A processor recommends a solution, based, at least in part, on the comparison.

11 Claims, 4 Drawing Sheets

(56) References Cited

OTHER PUBLICATIONS

U.S. Appl. No. 14/849,676, filed Sep. 10, 2015; Entitled "Pattern Based Behavior Model for System Management", pp. 1-28.
"IBM Tivoli Monitoring: Implementation and Performance Optimization for Large Scale Environments"; An IBM Redbooks Publication; IBM Redbook Form Number: SG24-7443-00; Publication Date: Feb. 6, 2008, Last Update: Jun. 19, 2008; Printed Sep. 22, 2014; <http://www.redbooks.ibm.com/abstracts/sg247443.html?Open>.
"Oracle Supply Chain Event Management"; Oracle E-Business Suite. Copyright 2013.
Grosclaude, Irene "Model-based monitoring of component-based software systems"; Jan. 2004; 6 Pages.

* cited by examiner

PATTERN BASED BEHAVIOR MODEL FOR SYSTEM MANAGEMENT

BACKGROUND OF THE INVENTION

The present invention relates generally to the field of data processing system management, and more particularly to create a pattern based behavioral model to provide guidance regarding the design, integration, and management of data processing systems.

Information technology (IT) is the application of computers and telecommunications equipment to store, retrieve, transmit and manipulate data—often in the context of a business or other enterprise. The term information technology is commonly used as a synonym for computers and computer networks, but the term also encompasses other information distribution technologies, such as television and telephones. Several industries are associated with IT, including computer hardware; software; electronics; semiconductors; Internet; telecom equipment; e-commerce; and computer services.

A data processing system is a combination of machines and people that, for a set of inputs, produces a defined set of outputs. The inputs and outputs are interpreted as data, facts, information, etc., depending on the interpreter's relation to the system. A common synonymous term is information system. A data processing system may involve some combination of: converting data to another format; ensuring that supplied data is clean, correct and useful; arranging items in some sequence and/or in different sets; reducing detail data to its main points; combining multiple pieces of data; the collection, organization, analysis, interpretation and presentation of data; and listing details of summary of data or computed information.

The end-to-end principle is a classic design principle in computer networking and states that in a general-purpose network, application-specific functions ought to reside in the end hosts of a network, rather than in intermediary nodes, provided that the functions can be implemented completely and correctly in the end hosts. The principle's fundamental notion is that the payoffs from adding functions to a simple network quickly diminish, especially when the end hosts have to re-implement the functions for reasons of completeness and correctness. Furthermore, as implementing any specific function incurs some resource penalties, regardless of whether the function is used or not, implementing a specific function in the network distributes the penalties among all clients, regardless of whether a client uses that function or not.

SUMMARY

Aspects of an embodiment of the present invention disclose a method, computer program product, and computer system for providing guidance and management of a data processing system. A processor stores at least one design pattern corresponding to a plurality of components of the data processing system. A processor generates a behavioral model of the data processing system based, at least in part, on the stored at least one design pattern. A processor monitors actual behavior of the data processing system. A processor compares the actual behavior of the data processing system to the behavioral model of the data processing system. A processor recommends a solution, based, at least in part, on the comparison.

DETAILED DESCRIPTION

In the current state of data processing system management, in many industries, an organization has multiple systems that run the organization's business. The systems are set up over time, typically without thought to the end to end effectiveness of the organization. As the number of systems increase, many organizations find it necessary to spend an increasingly higher proportion of the organization's revenue on the maintenance of the systems. Part of the problem is the organizations have no definition of how the systems work and interact together. Embodiments of the present invention recognize the organizations need to be able to identify the systems possessed, how the systems are behaving, and how the systems can be analyzed and improved.

Monitoring systems have been created to take a model of systems and how they are connected together. The monitoring systems map and log records from the components within the systems to the model. Thus, an operator is able to understand the alerts and errors being generated in the context of the interconnected systems. The monitoring approach creates context around the logging information coming from each system/component, making it possible to understand potential cause and effect and trace back to the root cause of a problem. Unfortunately, the monitoring systems do not understand the design intent of the end-to-end operation of the connected IT systems. Rules can be coded into the monitoring tool, so that a certain error can be identified as having a probable cause and consequence. However, coding rules does not create a systematic coverage of the end-to-end behavior.

Embodiments of the present invention recognize that what is needed is an overlay model that defines the end-to-end design intent of the interconnected systems and the emergent properties. Emergent properties are behaviors that emerge as a consequence of the way components/systems are connected together over and above the inherent properties of each individual component. Emergent properties often relate to non-functional requirements, such as system latency, reliability, and flexibility—each critical to the successful running of the end-to-end IT landscape. Embodiments of the present invention is focused on providing an additional behavioral layer to the monitoring. Providing this additional behavioral layer to the monitoring brings additional benefits to the organizations.

Data processing system, information system, and IT system will be used interchangeably. Additionally, pattern model and pattern based behavioral model will be used interchangeably.

Embodiments of the present invention will now be described in detail with reference to the Figures.

Figure 1:
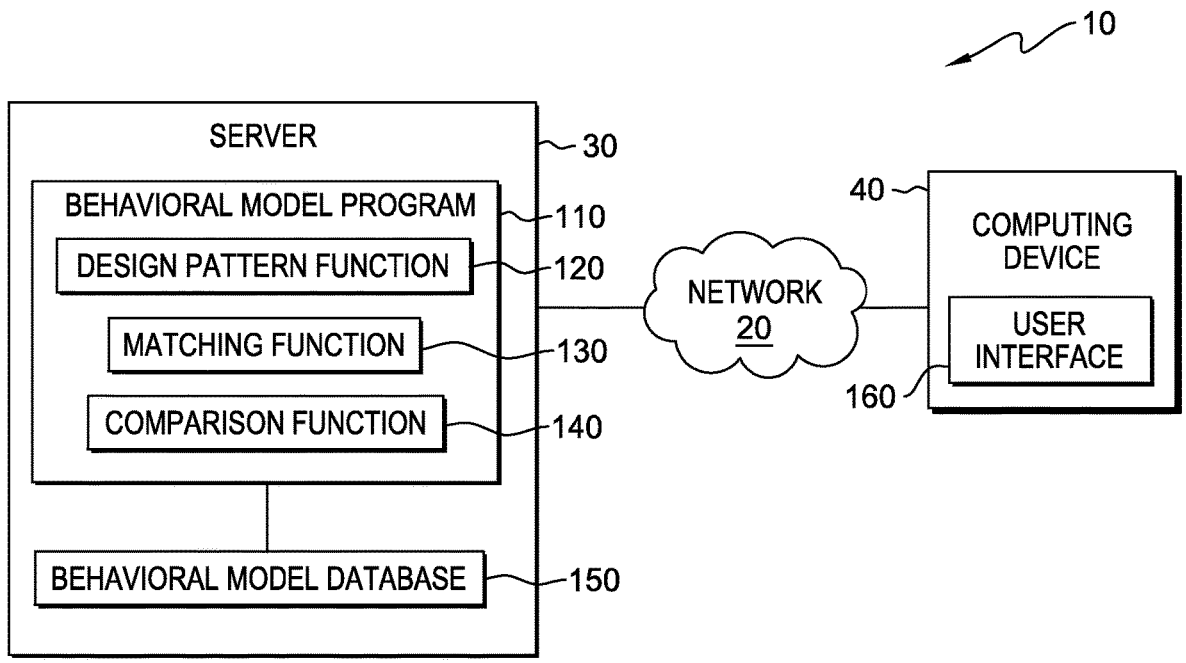
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing system 10 includes server 30 and computing device 40 interconnected over network 20. Network 20 may be a local area network (LAN), a wide area network (WAN) such as the Internet, a cellular data network, any combination thereof, or any combination of connections and protocols that will support communications between server 30 and computing device 40, in accordance with embodiments of the invention. Network 20 may include wired, wireless, or fiber optic connections. Computing system 10 may include additional computing devices, servers, or other devices not shown.

Server 30 may be a management server, a web server, or any other electronic device or computing system capable of processing program instructions and receiving and sending data. In some embodiments, server 30 may be a laptop computer, tablet computer, netbook computer, personal computer (PC), a desktop computer, or any programmable electronic device capable of communicating with computing device 40 via network 20. In other embodiments, server 30 may represent a server computing system utilizing multiple computers as a server system, such as in a cloud computing environment. In another embodiment, server 30 represents a computing system utilizing clustered computers and components to act as a single pool of seamless resources. Server 30 contains behavioral model program 110, design pattern function 120, matching function 130, comparison function 140, and behavioral model database 150. Server 30 may include components, as depicted and described in further detail with respect to FIG. 5.

Computing device 40 may be a desktop computer, laptop computer, netbook computer, or tablet computer. In general, computing device 40 may be any electronic device or computing system capable of processing program instructions, sending and receiving data, and communicating with server 30 via network 20. Computing device 40 contains user interface 160. Computing device 40 may include components, as depicted and described in further detail with respect to FIG. 5.

User interface 160 may be any user interface used to access information from server 30, such as information gathered and produced by behavioral model program 110. In some embodiments, user interface 160 may be a generic web browser used to retrieve, present, and traverse information resources from the Internet. In other embodiments, user interface 160 may be a software program or application that enables a user at computing device 40 to access server 30 over network 20. In the depicted embodiment, user interface 160 resides on computing device 40. In other embodiments, user interface 160, or similar user interfaces, may reside on another computing device, another server, or server 30, provided that user interface 160 is accessible to behavioral model program 110.

Behavioral model program 110 operates to create a pattern based behavioral model to provide guidance to the management of data processing systems. In doing so, behavioral model program 110 creates and stores design patterns. Behavioral model program 110 receives system information, matches system information to known patterns, and generates a pattern based behavior model. Behavioral model program 110 monitors a data processing system and compares the actual behavior of the system to the pattern based behavioral model. Behavioral model program 110 recommends solutions when the actual behavior of the system differs from the pattern based behavior model. In the depicted embodiment, behavioral model program 110 resides on server 30. In other embodiments, behavioral model program 110 may reside on another server, computing device, or computing device 40, provided that behavioral model program 110 can access behavioral model database 150 and user interface 160.

Design pattern function 120 operates to create and store design patterns. The design patterns created and stored may be used by matching function 130 to help generate a pattern based behavioral model. In the depicted embodiment, design pattern function 120 is a function of behavioral model program 110. In other embodiments, design pattern function 120 may be a separate program accessible by behavioral model program 110.

Matching function 130 operates to match known patterns with system data to describe the system based on identified and matched patterns. The system data is annotated and used to create a pattern based behavioral model. In the depicted embodiment, matching function 130 is a function of behavioral model program 110. In other embodiments, matching function 130 may be a separate program accessible by behavioral model program 110.

Comparison function 140 operates to compare the actual behavior of the system to the pattern based behavioral model, monitoring for behavior not in line with the pattern based behavioral model. Comparison function 140 recommends solutions to problems found in the system. In the depicted embodiment, comparison function 140 is a function of behavioral model program 110. In other embodiments, comparison function 140 may be a separate program accessible by behavioral model program 110.

Behavioral model database 150 may be a repository that may be written and/or read by behavioral model program 110. In some embodiments, behavioral model database 150 is a database that merely stores information. In other embodiments, behavioral model database 150 is a knowledge base that is governed by an ontology. A knowledge base is a technology used to store complex structured and unstructured information used by a computer system. A knowledge-based system consists of a knowledge base that represents facts and an inference engine that can reason about those facts and use rules and other forms of logic to deduce facts or highlight inconsistencies. In some embodiments, information stored in a knowledge base may include: function categories; descriptions; services; service functions; capabilities and configurations; and WordNet (a lexical database for the English language). An ontology is a formal, explicit specification of a shared abstract simplified view of some selected part of the world, containing the objects, concepts, and other entities that are presumed of interest for some particular purpose and the relationships between them.

In some embodiments, an ontology may use the information stored in a knowledge base to form and identify the relationships between different services. In some embodiments, a program (not shown) may allow a web developer, administrator, or other user to define previously found design patterns and store to behavioral model database 150. Design patterns describe the best practices for a creative discipline. Design patterns were first used for building architecture and have more recently been used by the information technology (IT) industry for describing best practices around hardware and software. An individual design pattern describes a common problem, a solution to that problem, and benefits and liabilities associated with using the solution. The solution is defined in terms of a collection of connected components. A component is a piece of hardware of software that has an interface. A component model is a definition of the way a set of components have been connected together. Not all combinations of components are as good as others, and different combinations of components achieve different results. In some embodiments, pattern languages are stored to behavioral model database 150.

A collection of design patterns that relate to the same topic and link to one another is called a pattern language. Pattern languages traditionally use textual descriptions for the patterns and are focused on human consumability rather than machine consumability. The term consumability refers to a client's complete experience with a technology solution, beginning with buying the right product to updating. Consumability also includes issues related to acquiring the product, installing and configuring the product, using the product, and troubleshooting problems that arise over the long term. A good pattern language has a formal metamodel that defines the types of components and the legal ways that these components can be connected together. Many of the patterns can be used as components in higher-level patterns. In the depicted embodiment, behavioral model database 150 resides on server 30. In other embodiments, behavioral model database 150 may reside on another server, computing device, or computing device 40, provided that behavioral model database 150 is accessible to behavioral model program 110.

Figure 2:
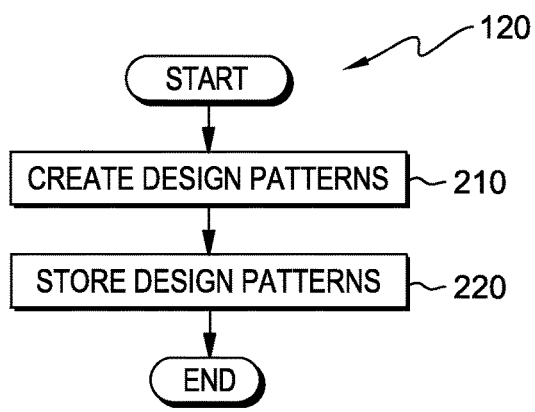
FIG. 2 depicts a flowchart of the steps of a design pattern function, executing within the computing system of FIG. 1, for creating and storing design patterns, in accordance with an embodiment of the present invention.

FIG. 2 depicts a flowchart of the steps of a design pattern function, executing within the computing system of FIG. 1, in accordance with an embodiment of the present invention. Design pattern function 120 operates to create and store design patterns, in accordance with one embodiment of the present invention.

In step 210, design pattern function 120 creates design patterns. In some embodiments, design pattern function 120 creates design patterns. In other embodiments, design pattern function 120 creates, modifies, merges, or deletes design patterns. In some embodiments, design patterns may be established by a user through a user interface, such as user interface 160. The design pattern may be represented as a set of text descriptions and a metamodel. In some embodiments, the metamodel may be defined in the web ontology language (OWL). In other embodiments, the design pattern may be defined as a graph or tree with a metamodel. In other embodiments, design patterns may be established through an automated process. During this automated process, design pattern function 120 receives system information and creates design patterns based on the system information received. The design patterns created include solutions to common problems in the form of a collection of components connected together in a particular way. A component is a piece of hardware or software that has an interface. A component model is a definition of the way a set of components have been connected together. Not all combinations are as good as others, and different combinations of components achieve different results.

In step 220, design pattern function 120 stores design patterns to a repository, such as behavioral model database 150. In some embodiments, design pattern function 120 may generate one or more reports that include a description of a common problem, a solution to that problem, and benefits and liabilities of using the solution. In other embodiments, design pattern function 120 may store the information gathered. Still, in some embodiments, generated reports, or information obtained, are stored to behavioral model database 150, for later use by behavioral model program 110; matching function 130; comparison function 140; an organization's IT personnel; and/or users accessing server 30 through user interface 160 on computing device 40.

As more and more design patterns are stored in behavioral model database 150, pattern languages are formulated. A pattern language is a collection of design patterns that relate to the same topic and link to one another. Pattern languages traditionally use textual descriptions for the patterns and are focused on human consumability rather than machine consumability. A good pattern language has a metamodel that defines the types of components and the legal ways the components can be connected together. Many of the patterns can be used as components in higher-level patterns.

A metamodel is a model of a model, and metamodeling is the process of generating such metamodels. A metamodel is a simplified model of an actual model of a circuit, system, or software-like entity and can be a mathematical relation or algorithm representing input and output relations. Metamodeling is the analysis, construction, and development of the frames, rules, constraints, models, and theories applicable and useful for modeling a predefined class of problems.

Metamodels are closely related to ontologies. Both are often used to describe and analyze the relations between concepts. On one hand, an ontology is a formal naming and definition of the types, properties, and interrelationships of the entities that really or fundamentally exist for a particular domain of disclosure. An ontology compartmentalizes the variables needed for some set of computations and establishes the relationships between the variables. On the other hand, metamodeling can be considered as an explicit description (constructs and rules) of how a domain-specific model is built, comprising a formalized specification of the domain-specific notations. Typically, metamodels are—and should always follow—a strict rule set. A valid metamodel is an ontology, but not all ontologies are modelled explicitly as metamodels.

Figure 3:
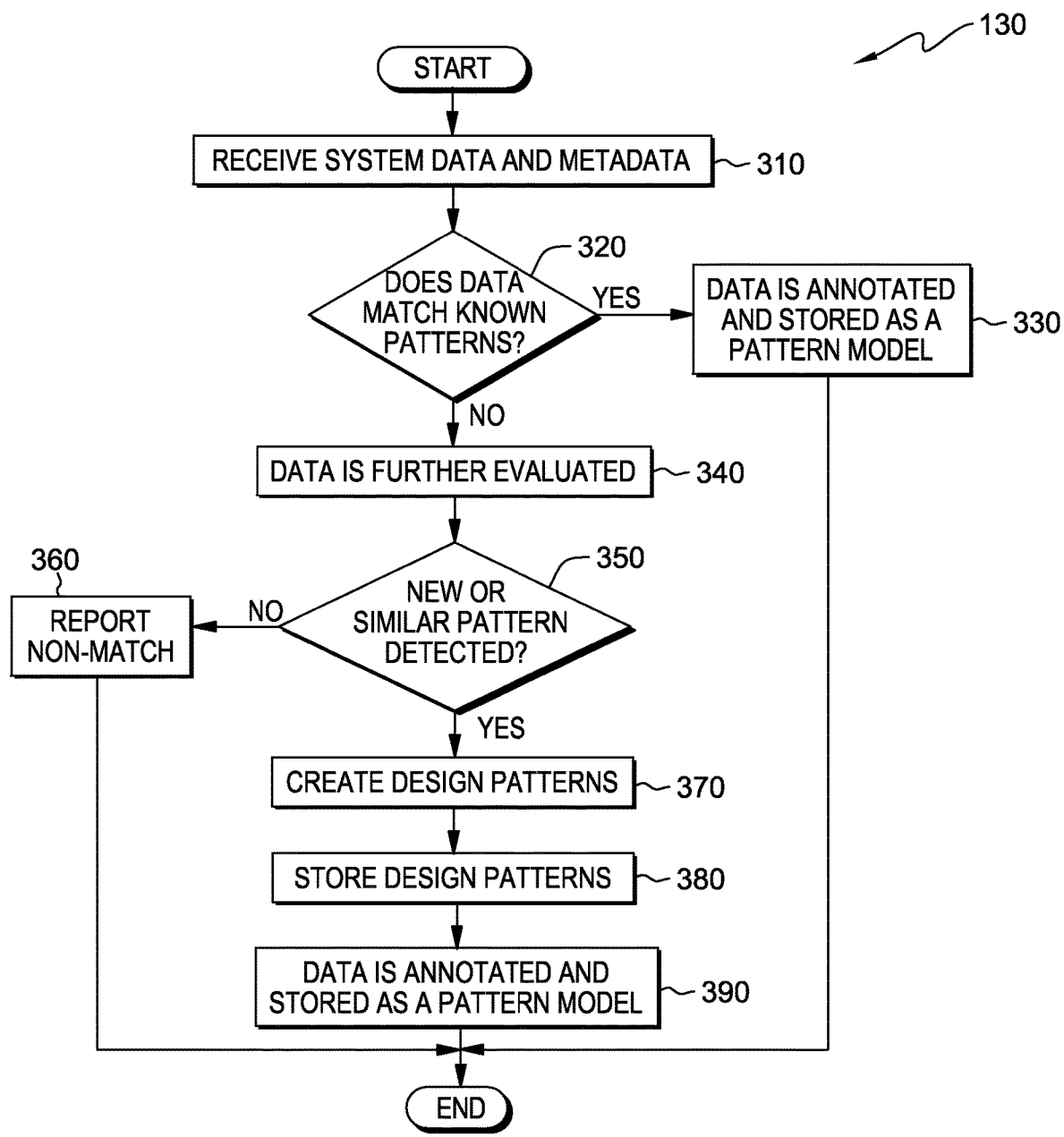
FIG. 3 depicts a flowchart of the steps of a matching function, executing within the computing system of FIG. 1, for matching known patterns with system data to describe the system based on identified and matched patterns, in accordance with an embodiment of the present invention.

FIG. 3 depicts a flowchart of the steps of a matching function, executing within the computing system of FIG. 1, in accordance with an embodiment of the present invention. Matching function 130 operates to match system data with known patterns to describe the system based on identified and matched patterns, in accordance with one embodiment of the present invention.

In step 310, matching function 130 receives system data and metadata. System data and metadata are received to classify the system based on the patterns that are input and available. System data and metadata may be described as just system data or, merely, data.

In decision 320, matching function 130 determines whether the data matches the known patterns stored in behavioral model database 150. As the system's classification proceeds, analysis routines start matching patterns, classifying the system data and metadata into higher level patterns. System classification may incorporate a broad array of available algorithms, such as, graph pattern matching, incremental graph pattern matching, and probabilistic semantic matching. If the data does match the known patterns (decision 320, yes branch), matching function 130 annotates and stores the data as a pattern model in behavioral model database 150 (step 330). The annotation of the system data and metadata establishes a relationship between the system data and metadata and the known patterns. If the data does not match the known patterns (decision 320, no branch), matching function 130 further evaluates the data (step 340).

In step 340, further evaluation takes place when it is unclear if the data matches the known patterns, in addition to if the data does not match the known patterns. If the matching is unclear, in some embodiments, the data may be sent to a user for review and manual decision-making. In other embodiments, matching function 130 may review the data and make a decision internally. If the data clearly does not match the known patterns, matching function 130 may suggest new patterns, suggest modification of existing patterns, and/or require additional internal analysis or manual review by a user to properly map and, eventually, annotate the pattern model.

In decision 350, matching function 130 determines whether new or similar patterns are detected. If new or similar patterns are not detected (decision 350, no branch), matching function 130 reports non-match (step 360). If new or similar patterns are detected (decision 350, yes branch), matching function 130 creates design patterns (step 370).

In step 370, the design patterns created include solutions to common problems in the form of a collection of components connected together in a particular way. A component is a piece of hardware or software that has an interface. A component model is a definition of the way a set of components have been connected together. Not all combinations are as good as others, and different combinations of components achieve different results.

In step 380, matching function 130 stores design patterns to a repository, such as behavioral model database 150. In some embodiments, matching function 130 may generate one or more reports that include a description of a common problem, a solution to that problem, and benefits and liabilities of using the solution. In other embodiments, matching function 130 may store the information gathered. Still, in some embodiments, generated reports, or information obtained, are stored to behavioral model database 150, for later use by behavioral model program 110, comparison function 140, an organization's IT personnel, and/or users accessing server 30 through user interface 160 on computing device 40.

In step 390, matching function 130 annotates and stores the data as a pattern model. In one embodiment, matching function 130 uses the stored annotated data and design patterns stored in behavioral model database 150 to generate a pattern model. A collection of design patterns that relate to the same topic and link to one another is called a pattern language; some pattern languages have a formal metamodel that defines the types of components and the legal ways that the components can be connected together.

In some embodiments, the present invention uses a formal model of a pattern language to annotate metadata about a deployed set of integrated IT systems. The present invention uses machine reasoning and/or inference to create a pattern based behavioral model of the IT systems. The model is built up in layers, where the higher layers expose the end-to-end behavior of the IT systems that are not visible in the fine-grained detail of traditional monitoring and metamodeling approaches. In some embodiments, it is possible to annotate the metadata with the pattern names that refer to the component's behavior.

The pattern language is represented as a set of text descriptions and a metamodel that defines the hierarchies in the pattern language. In some embodiments, the metamodel may be defined in the web ontology language (OWL).

In some embodiments, the pattern language has two types of pattern hierarchies. The first type of pattern hierarchy is containment hierarchy, which is when a solution described in a pattern uses a set of components configured in a certain way. The components may be patterns or components. When a pattern is used as a component, the pattern has a solution that expands out into another layer of components. The second type of pattern hierarchy is patterns organized in groups. The lead pattern in the group is a generalized version of the pattern; the remaining patterns in the group are specializations. When the lead pattern is used in another pattern's solution, any of the specializations can be substituted (but not vice versa). These two hierarchies in the pattern language allow the present invention to classify real-world components and group the real-world components according to pattern definitions.

The present invention is not a one-time process. As new system components are available, or as existing system components change, the pattern model needs to be evaluated for changes and updates as well.

Figure 4:
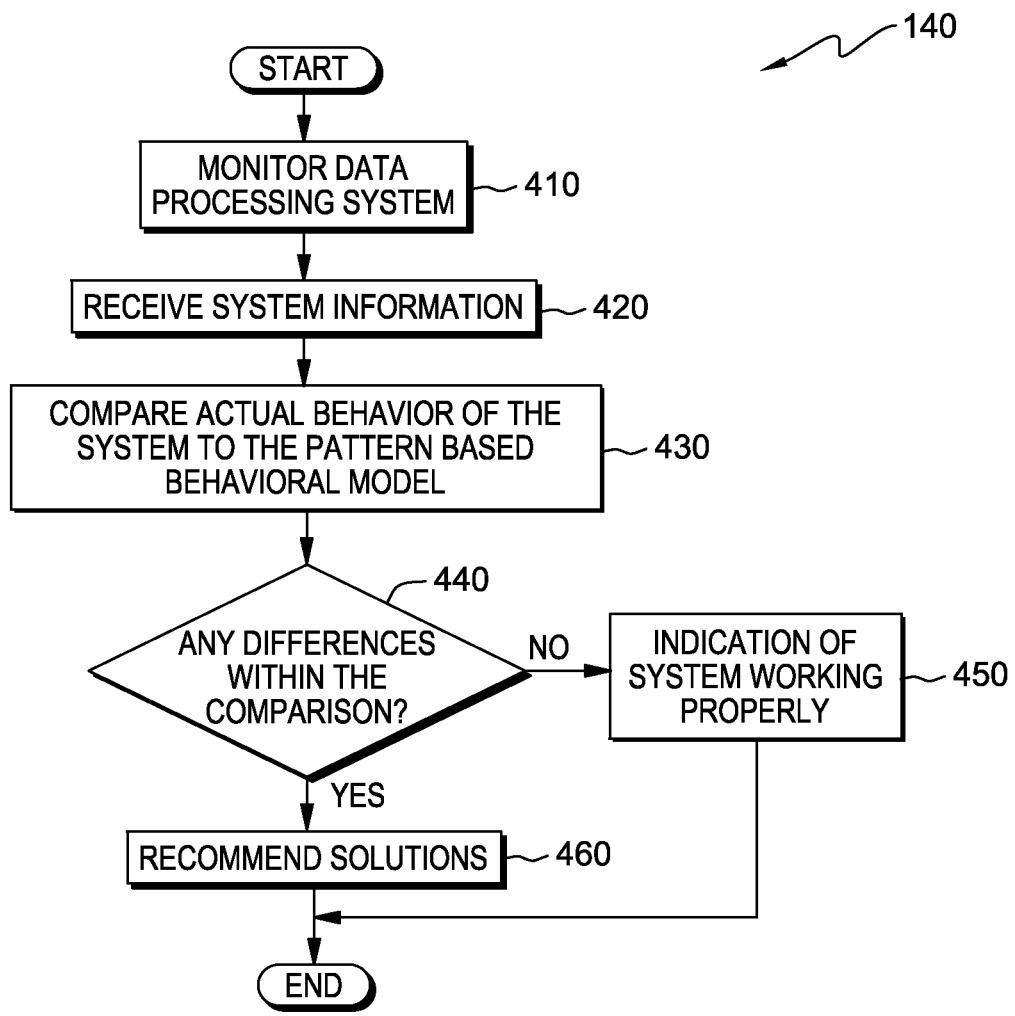
FIG. 4 depicts a flowchart of the steps of a comparison function, executing within the computing system of FIG. 1, for comparing the actual behavior of the system to the pattern based behavioral model to monitor for behavior not in line with the pattern based behavioral model, in accordance with an embodiment of the present invention.

FIG. 4 depicts a flowchart of the steps of a comparison function, executing within the computing system of FIG. 1, in accordance with an embodiment of the present invention. Comparison function 140 operates to compare the actual behavior of the system to the pattern based behavioral model to monitor for behavior not in line with the pattern based behavioral model, in accordance with one embodiment of the present invention.

In step 410, comparison function 140 monitors data processing system. Comparison function 140 monitors the data processing system for behavior not in line with the pattern model established in FIG. 3. In some embodiments, comparison function 140 uses user interface 160 to monitor the data processing system. In other embodiments, comparison function 140 uses internal means to monitor the data processing system. Comparison function 140 monitors the way various components interact within the data processing system. The monitored data can be used to provide insight to make the data processing system run effectively and efficiently.

In step 420, comparison function 140 receives system information. The monitored data is captured by comparison function 140, and missing log entries along with errors can be analyzed, both automatically and visually, to understand the context of the error, the seriousness of the error, and the consequences of the error. In some embodiments, the data is stored to a repository, such as behavioral model database 150. In other embodiments, comparison function 140 uses a log file. A log file is a file that records either the events which happen while an operating system or other software runs, or the personal messages between different users of a communication software. The act of keeping a log is called logging. In some embodiments, the log file resides within behavioral model program 110. In other embodiments, the log file resides within behavioral model database 150. Still, in some embodiments, the log file stands alone, as a separate repository.

Some products, such as an information server, have a metadata repository, describing the systems and components in the IT landscape. An information server is an integrated software platform, consisting of a set of core functional modules that enable organizations to integrate data from disparate sources and deliver trusted and complete information at the time it is required and in the format needed. Similar to how an application server is a software engine that delivers applications to client computers, an information server delivers consistent information to consuming applications, business processes, and portals.

The metadata repository records the type of component and/or system and the details about the specific deployment of that type of component. This metadata can be populated manually or through various discovery tools. Important, or troublesome, components will have more detailed metadata than others. The metadata descriptions of the deployed components are linked together to show dependencies. The present invention, in some embodiments, may use a metadata repository to receive initial information concerning systems being monitored. In some embodiments, the metadata repository resides within behavioral model program 110. In other embodiments, the metadata repository resides within behavioral model database 150. Still, in some embodiments, the metadata repository stands alone, as a separate repository.

In step 430, comparison function 140 compares the actual behavior of the system to the pattern based behavioral model. The present invention matches the actual behavior of a set of integrated IT systems against the design intent for these systems, as expressed by a behavioral model that is based on the stored design patterns corresponding to components of the system and defined from a formal pattern language. The pattern based behavioral model provides insight into how the IT systems are designed and integrated together. The pattern based behavioral model identifies poor design and flaws in the architecture if there are no matching patterns (or identified anti-patterns) are found.

In decision 440, comparison function 140 determines whether there are any differences within the comparison. If there are no differences within the comparison (decision 440, no branch), comparison function 140 indicates system working properly (step 450). If there are differences within the comparison (decision 440, yes branch), comparison function 140 recommends solutions (step 460).

In step 460, comparison function 140 may recommend a wide range of solutions, for example, suggest the need for modifications of the pattern model based on emergent properties. Emergent properties are behaviors that emerge as a consequence of the way components or systems are connected together over and above the inherent properties of each individual component. Emergent properties often relate to non-functional requirements, such as latency, reliability, and flexibility, each critical to the successful operation of the end-to-end IT landscape. In some embodiments, comparison function 140 provides solutions directly to the IT systems. In other embodiments, comparison function 140 provides solutions to IT administrators who maintain the IT systems.

The pattern based behavioral model provides useful analysis to be used to drive new projects to improve the information management in the IT systems. The behavior model has further value in real-time monitoring. The patterns can suggest the most efficient and effective types of monitoring to add to the environment to verify the correct operation of the pattern. The monitoring data can be mapped to the patterns to ensure the systems are operating according to the patterns and, if failure occurs, the significance and potential impact of the failure. Since the formal model of the pattern language enables well-defined rules of expected behavior from the systems, a great deal of the solution could be automated.

With each pattern layer added, there is an additional understanding of how the end-to-end system works. An analysis routine can prompt for missing components and violations of the pattern, repetitions and redundancies that indicate risk of information corruption, or opportunities for information optimization. The recommended solutions can assist IT systems to run properly, as intended from the initial design, for long periods of time.

Figure 5:
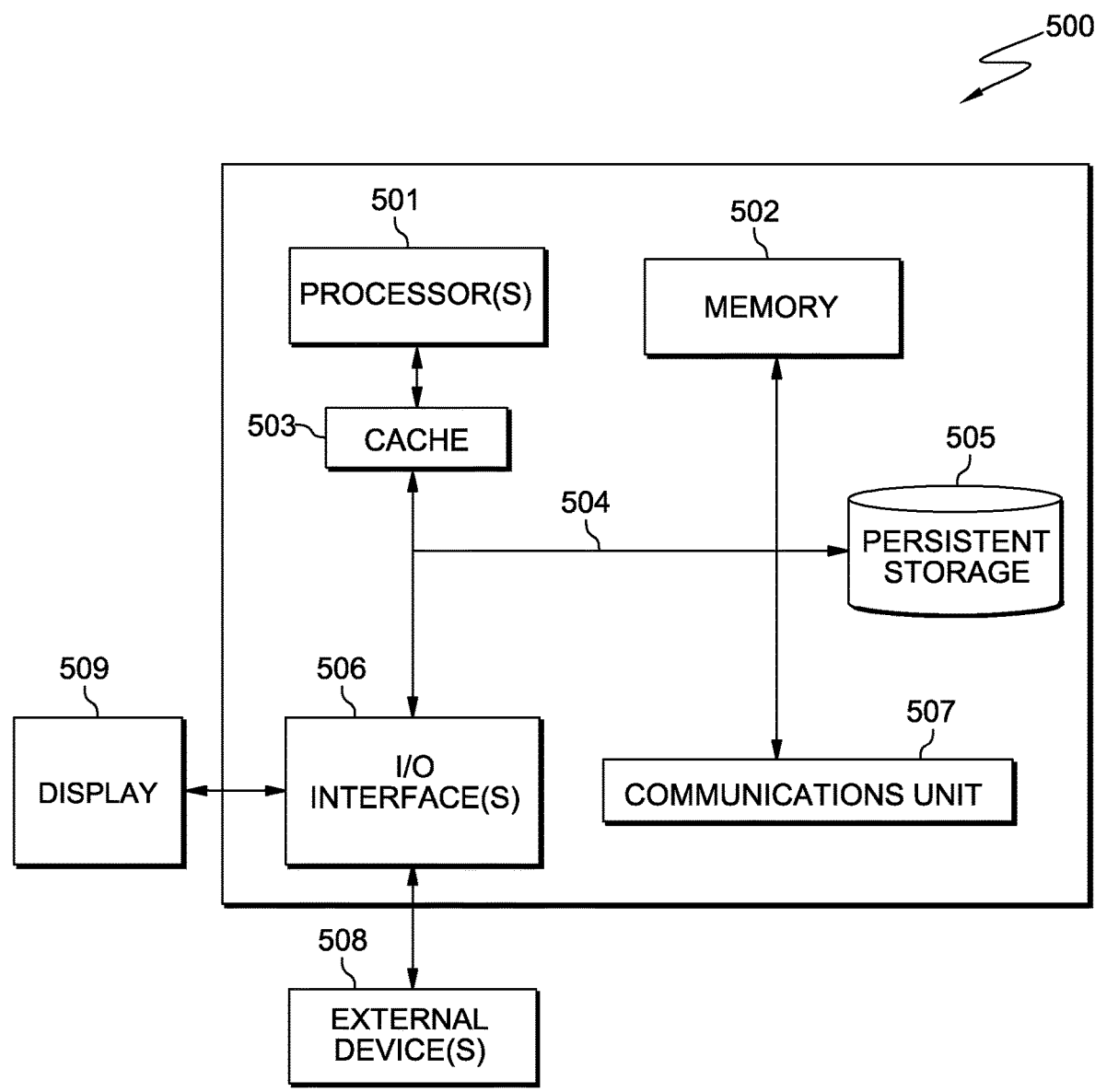
FIG. 5 depicts a block diagram of components of the server and the computing device, in accordance with an embodiment of the present invention.

FIG. 5 depicts computer system 500, which is an example of a system that includes components of server 30 and computing device 40. Computer system 500 includes processors 501, cache 503, memory 502, persistent storage 505, communications unit 507, input/output (I/O) interface(s) 506 and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507. Behavioral model program 110, design pattern function 120, matching function 130, comparison function 140, and behavioral model database 150 may be downloaded to persistent storage 505 of server 30 through communications unit 507 of server 30. User interface 160 may be downloaded to persistent storage 505 of computing device 40 through communications unit 507 of computing device 40.

I/O interface(s) 506 allows for input and output of data with other devices that may be connected to each computer system. For example, I/O interface 506 may provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention, e.g., behavioral model program 110, design pattern function 120, matching function 130, comparison function 140, and behavioral model database 150, can be stored on such portable computer readable storage media and can be loaded onto persistent storage 505 of server 30 via I/O interface(s) 506 of server 30. Software and data used to practice embodiments of the present invention, e.g., user interface 160, can be stored on such portable computer readable storage media and can be loaded onto persistent storage 505 of computing device 40 via I/O interface(s) 506 of computing device 40. I/O interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for providing guidance and management of a data processing system, the computer program product comprising:
   one or more computer readable hardware storage media and program instructions stored on the one or more computer readable hardware storage media, the program instructions comprising:
   program instructions to store at least one design pattern corresponding to a plurality of components of the data processing system, wherein:
      the at least one design pattern is represented as a set of text descriptions and a metamodel;
      the metamodel is defined in the web ontology language (OWL); and
      the at least one design pattern describes a problem, a solution to the problem, and benefits and liabilities associated with using the solution;
   program instructions to generate a behavioral model of the data processing system based, at least in part, on the stored at least one design pattern, wherein:
      the behavioral model is a pattern based behavioral model of the data processing system; and
      the behavioral model includes annotations to the metadata with pattern names that refer to component behavior;
   program instructions to monitor actual behavior of the data processing system;
   program instructions to compare the actual behavior of the data processing system to the behavioral model of the data processing system; and
   program instructions to recommend a solution, based, at least in part, on the comparison wherein the solution: (i) is defined in terms of a collection of the plurality of components; and (ii) comprises a suggestion of modifications to the behavioral model based on properties that emerge as a consequence of how the plurality of components are connected together.

2. The computer program product of claim 1, wherein program instructions to generate the behavioral model of the data processing system comprise:
   program instructions to receive system data and metadata;
   program instructions to match the system data and the metadata to the stored at least one design pattern;
   program instructions to annotate the system data and the metadata to indicate an association with the at least one design pattern; and
   program instructions to store the annotated system data and the annotated metadata.

3. The computer program product of claim 1, wherein program instructions to monitor actual behavior of the data processing system comprise program instructions to receive system information, wherein the system information is information describing behavior of the data processing system that includes a record of missing log entries and errors.

4. The computer program product of claim 1, further comprising:
   program instructions, stored on the one or more computer readable storage media, to perform an action on the at least one design pattern corresponding to the plurality of components of the data processing system.

5. The computer program product of claim 4, wherein the action includes create, modify, merge, and delete.

6. The computer program product of claim 1, wherein the properties include system latency, system reliability, and system flexibility.

7. A computer system for providing guidance and management of a data processing system, the computer system comprising:
   one or more computer processors, one or more computer readable storage media, and program instructions stored on the computer readable storage media for execution by at least one of the one or more processors, the program instructions comprising:
   program instructions to store at least one design pattern corresponding to a plurality of components of the data processing system, wherein:
      the at least one design pattern is represented as a set of text descriptions and a metamodel;
      the metamodel is defined in the web ontology language (OWL); and
      the at least one design pattern describes a problem, a solution to the problem, and benefits and liabilities associated with using the solution;
   program instructions to generate a behavioral model of the data processing system based, at least in part, on the stored at least one design pattern, wherein:
      the behavioral model is a pattern based behavioral model of the data processing system; and
      the behavioral model includes annotations to the metadata with pattern names that refer to component behavior;
   program instructions to monitor actual behavior of the data processing system;
   program instructions to compare the actual behavior of the data processing system to the behavioral model of the data processing system; and
   program instructions to recommend a solution, based, at least in part, on the comparison wherein the solution: (i) is defined in terms of a collection of the plurality of components; and (ii) comprises a suggestion of modifications to the behavioral model based on properties that emerge as a consequence of how the plurality of components are connected together.

8. The computer system of claim 7, wherein program instructions to generate the behavioral model of the data processing system comprise:
    program instructions to receive system data and metadata;
    program instructions to match the system data and the metadata to the stored at least one design pattern;
    program instructions to annotate the system data and the metadata to indicate an association with the at least one design pattern; and
    program instructions to store the annotated system data and the annotated metadata.

9. The computer system of claim 7, wherein program instructions to monitor actual behavior of the data processing system comprise program instructions to receive system information, wherein the system information is information describing behavior of the data processing system that includes a record of missing log entries and errors.

10. The computer system of claim 7, further comprising:
    program instructions, stored on the one or more computer readable storage media for execution by at least one of the one or more processors, to perform an action on the at least one design pattern corresponding to the plurality of components of the data processing system.

11. The computer system of claim 10, wherein the action includes create, modify, merge, and delete.

* * * * *